Sept. 2, 1958        O. W. WADE        2,849,803
APPARATUS FOR APPLYING MARKS TO A TEST SPECIMEN
Filed April 11, 1958
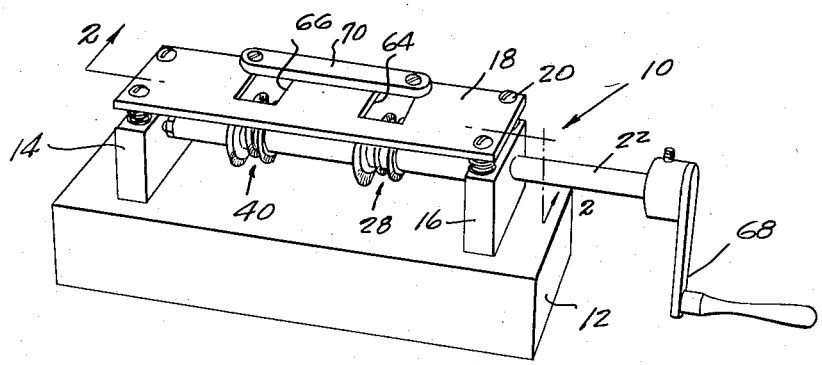
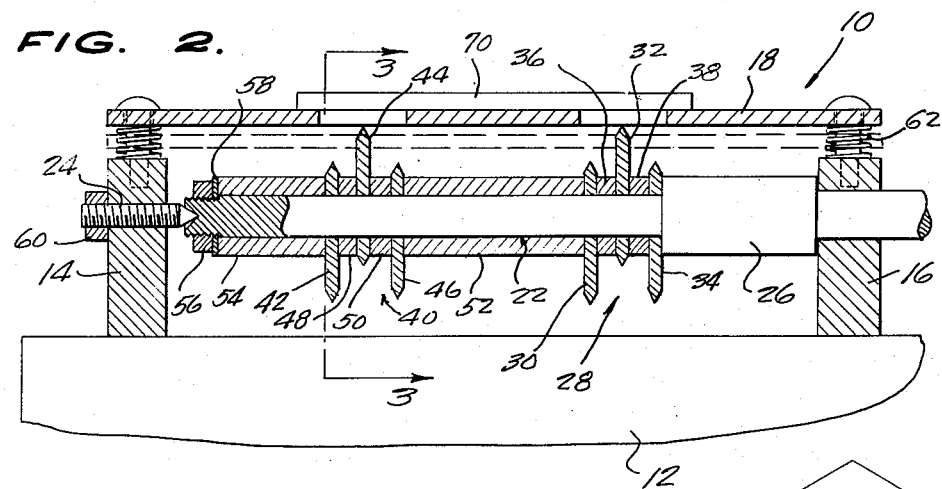
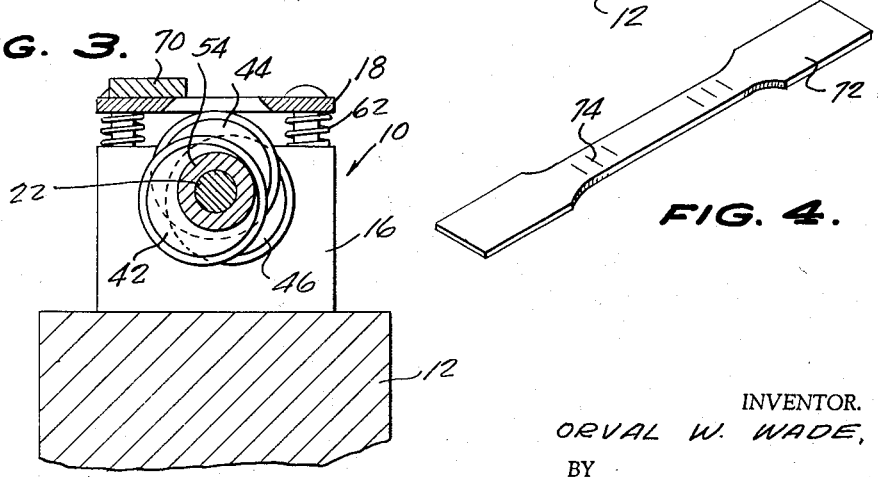
INVENTOR.
ORVAL W. WADE,
BY
McMorrow, Berman & Davidson
ATTORNEYS.

United States Patent Office 2,849,803
Patented Sept. 2, 1958

2,849,803

APPARATUS FOR APPLYING MARKS TO A TEST SPECIMEN

Orval W. Wade, Littleton, Colo.

Application April 11, 1958, Serial No. 727,813

2 Claims. (Cl. 33—189)

The present invention relates to an apparatus for applying elongation marks to a tensile test specimen.

An object of the present invention is to provide an apparatus for applying elongation marks to a tensile test specimen which lends itself to quick and accurate marking of such a test specimen, the tensile strength of which is to be tested.

Another object of the present invention is to provide an apparatus for applying elongation marks to a tensile test specimen which lends itself to ready manufacture in such sizes and with such spaces between the marking wheels as desired so as to accommodate test specimens of various lengths.

A further object of the present invention is to provide an apparatus for applying elongation marks to a tensile test specimen which is readily portable, one sturdy in construction, one simple in structure readily assembled and disassembled, and one which is economically feasible.

These and other objects and advantages of the present invention will be fully apparent from the following description when taken in conjunction with the annexed drawing, in which:

Figure 1 is an isometric view of the apparatus of the present invention;

Figure 2 is a view on an enlarged scale, taken on the line 2—2 of Figure 1;

Figure 3 is a view taken on the line 3—3 of Figure 2; and

Figure 4 is an isometric view of a sample tensile test specimen, showing marks thereon made by the apparatus according to the present invention.

Referring to the drawing in which like numerals indicate like parts throughout the several views, the reference numeral 10 designates generally the apparatus of the present invention which comprises a base 12 and two standards 14 and 16 arranged in spaced relation and rising from the base 12. A platform 18 extends over the top ends of the standards 14 and 16 and is connected by bolts 20 for movement toward and away from the top ends of the standards 14 and 16.

A horizontally disposed shaft 22 is supported above the base 12 and has a portion adjacent one end extending through the standard 16. A centering pin 24 is threadedly engaged in the other standard 14 and has one end thereof received in a centering hole in the end of the shaft 22 remote from the projecting end portion.

The shaft 22 carries an enlarged portion 26 inwardly of the portion of the shaft 22 which projects exteriorly of the standard 16. A first group 28 of marking wheels 30, 32, and 34 is mounted on the shaft 22 adjacent the end of the enlarged portion 26 remote from the standard 16, the wheels 30, 32, and 34 being spaced from each other by means of collars 36 and 38. Another group of marking wheels, designated by the reference numeral 40, is arranged in spaced relation on the shaft 22 inwardly of and spaced from the end of the shaft 22 remote from the standard 16. The wheels in the group 40 are numbered 42, 44, and 46.

The wheels 30 and 42 constitute a pair arranged eccentrically on the shaft 22 and in alignment with each other. Similarly, the wheels 32 and 44 are in alignment, and the wheels 34 and 46 are in alignment with each other, each constituting a pair arranged eccentrically with respect to the shaft 22, as shown most clearly in Figure 3.

Collars 48 and 50 separate the wheels 42, 44 and 46 from each other and a bushing 52 maintains the group of wheels 28 in spaced relation with respect to the group 40. Another bushing 54 extends from the wheel 42 to the end of the shaft 22 and a nut 56 is threaded upon the threaded end portion of the shaft 22 with a resilient washer 58 between the nut 56 and the adjacent end of the bushing 54. The nut 56 forms a means of maintaining all of the wheels and their respective collars and bushings on the shaft 22 in the desired relationship relative to each other.

A nut 60 on the threaded projecting end portion of the centering pin 24 serves as a means of adjusting the support end of the centering pin 24 in the centering hole provided in the end of the shaft 22. A coil spring 62 is circumposed about each bolt 20 intermediate the platform 18 and the top ends of the standards 14 and 16 and serves as spring means operatively connected to the platform 18 and the standards 14 and 16, respectively, for urging the platform 18 away from the top ends of the standards 14 and 16.

The platform 18 is provided with a pair of openings 64 and 66 arranged so as to be in registry with the groups 28 and 40 of marking wheels, respectively. A handle assembly 68 constitutes manually actuable means for effecting the rotation of the shaft 22. The upper face of the platform 18 is provided with a stop 70 against which a specimen 72 (Figure 4) may be positioned so as to have portions of the specimen 72 in registry with the openings 64 and 66. Upon the application of a manually applied pressure to the upper face of the specimen 72, the platform 18 will be depressed against the resistance of the coil spring 62 so that portions of the peripheries of the marking wheels in the groups 28 and 40 of the marking wheels will project upwardly through the openings 64 and 66 and will engage the underface of the specimen 72 to provide thereon elongation markings 74 (Figure 4) which may be used when the specimen 72 is subjected to tensile strength testing operations for indicating the elongation of the specimen 72 as a result of such operations.

The groups of marking wheels on the shaft 22 together with their associated collars and bushings may be readily shifted to provide any combination of pairs of wheels in any number of groups desired for varying the position and number of markings upon such a tensile test specimen as is shown in Figure 4.

What is claimed is:

1. Apparatus for applying marks to a test specimen comprising a base adapted to rest upon a supporting surface, at least two spaced standards rising from said base, a platform extending over the top ends of said standards and connected to said standards for movement toward and away from the top ends of said standards, a horizontally disposed shaft spaced above said base and rotatably supported in said standards intermediate the ends thereof, spring means operatively connected to said platform and said standards for biasing said platform away from the upper ends of said standards, there being an opening in said platform, the upper face of said platform being adapted to support a test specimen in registering relation with respect to the platform opening, at least two spaced marking wheels on said shaft and in registry with the platform opening, and hand actuable means on said shaft for effecting the rotation of the latter, said platform being manually movable against the action of said spring means toward the top ends of said standard when a test specimen is supported on the upper surface of said platform in registering relation with respect to the platform opening to project peripheral portions of said marking wheels through said opening and into contacting engagement with the underface of said specimen.

2. Apparatus for applying marks to a test specimen comprising a base adapted to rest upon a supporting surface, at least two spaced standards rising from said base, a platform extending over the top ends of said standards and connected to said standards for movement toward and away from the top ends of said standards, a horizontally disposed shaft spaced above said base and rotatably supported in said standards intermediate the ends thereof, spring means operatively connected to said platform and said standards for biasing said platform away from the upper ends of said standards, there being an opening in said platform, the upper face of said platform being adapted to support a test specimen in registering relation with respect to the platform opening, at least two spaced groups of marking wheels on said shaft and in registry with the platform opening, the marking wheels of each group being eccentrically mounted on said shaft, and hand actuable means on said shaft for effecting the rotation of the latter, said platform being manually movable against the action of said spring means toward the top ends of said standard when a test specimen is supported on the upper surface of said platform in registering relation with respect to the platform opening to project peripheral portions of said marking wheels through said opening and into contacting engagement with the underface of said specimen.

References Cited in the file of this patent

UNITED STATES PATENTS

| | | |
|---|---|---|
| 520,424 | Guyer | May 29, 1894 |
| 1,483,677 | Peterson | Feb. 12, 1924 |
| 1,681,716 | Webster | Aug. 21, 1928 |